US007635094B2

(12) United States Patent
Chou et al.

(10) Patent No.: US 7,635,094 B2
(45) Date of Patent: Dec. 22, 2009

(54) MICRO-SPRAY SYSTEM RESONANCE FREQUENCY MODULATION METHOD AND DEVICE

(75) Inventors: Po-Fu Chou, Hsinchu Hsien (TW); Chi-Ming Huang, Hsinchu Hsien (TW); En-Wei Chang, Hsinchu Hsien (TW); Hung-Liang Chiang, Hsinchu Hsien (TW)

(73) Assignee: Industrial Technology Research Institute, Hsinchu Hsieh (TW)

( * ) Notice: Subject to any disclaimer, the term of this patent is extended or adjusted under 35 U.S.C. 154(b) by 388 days.

(21) Appl. No.: 11/465,732

(22) Filed: Aug. 18, 2006

(65) Prior Publication Data

US 2007/0152081 A1 Jul. 5, 2007

(30) Foreign Application Priority Data

Dec. 30, 2005 (TW) .............................. 94147384 A

(51) Int. Cl.

| | |
|---|---|
| ***B05B 3/14*** | (2006.01) |
| ***B05B 1/30*** | (2006.01) |
| ***B05B 1/34*** | (2006.01) |
| ***G01H 13/00*** | (2006.01) |

(52) U.S. Cl. ................... 239/102.2; 239/67; 239/102.1; 239/533.13; 239/533.14; 73/579

(58) Field of Classification Search ..................... 239/4, 239/102.1, 103.3, 337, 338, 533.13, 533.14, 239/67, 69; 73/1.82, 579, 581; 333/219, 333/235

See application file for complete search history.

(56) References Cited

U.S. PATENT DOCUMENTS

| | | | | |
|---|---|---|---|---|
| 3,103,310 | A * | 9/1963 | Lang | 239/4 |
| 3,901,443 | A * | 8/1975 | Mitsui et al. | 239/102.2 |
| 5,582,348 | A | 12/1996 | Erickson et al. | |
| 5,805,028 | A | 9/1998 | Kato | |
| 6,422,080 | B1 | 7/2002 | Lalouette | |
| 6,569,109 | B2 | 5/2003 | Sakurai et al. | |
| 6,819,027 | B2 | 11/2004 | Saraf | |

FOREIGN PATENT DOCUMENTS

| | | |
|---|---|---|
| CN | 200510097577X | 5/2009 |
| TW | 497482 | 11/1990 |

* cited by examiner

*Primary Examiner*—Darren W Gorman
(74) *Attorney, Agent, or Firm*—WPAT, P.C.; Anthony King

(57) ABSTRACT

A micro-spray system resonance frequency modulation method and device designed to minimize resonance frequency drift during atomization involves using a resonance frequency modulation unit for modulating resonance frequency and nodes, controlling and calibrating resonance frequency, and performing real-time measurement and correction to prevent operating frequency from drifting beyond a preferred operating frequency range, with a view to increasing spray flow and spray area, minimizing effects of ambient factors, and overcoming drawbacks of prior art.

9 Claims, 6 Drawing Sheets

MICRO-SPRAY SYSTEM RESONANCE FREQUENCY MODULATION METHOD AND DEVICE

BACKGROUND OF THE INVENTION

1. Field of the Invention

The present invention relates to a spray system resonance frequency modulation technology, and more particularly, to a micro-spray system resonance frequency modulation method and device.

2. Description of Related Art

Spray systems have been in use for years. As regards the oldest spray system, liquids are atomized mostly by means of pressurized gases. However, as technology advances, technological/engineering systems are becoming more miniaturized and more energy-saving so as to be increasingly efficient and compact, resulting in the use of actuators made of piezoelectric materials in a micro-spray system for atomization. A piezoelectric micro-spray system nowadays is typically miniaturized and energy-saving to such a great extent that it is in wide use, for example, micro-cooling units used in computers to achieve heat dissipation. Owing to the demand for ever-increasing computer speed and functions, CPU has to work faster and faster, which in turn brings about a surge of power consumption and heat generation. To cope with this, a micro-spray cooling system replaces a conventional fan cooling system in dissipating heat generated by computer, so as to enhance cooling efficiency. In addition, a nebulizer, a product of biotechnology, medicine and pharmacy, rely upon a piezoelectric micro-spray system for reducing the size of medication to micro-dimensions such that a drug can be inhaled via the oral-nasal route and subsequently be delivered to and absorbed by the lungs. The above-mentioned are typical examples of the application of a micro-spray system to engineering.

A piezoelectric micro-spray system is operated mostly at resonance frequency and thereby is characterized by considerable vibrational energy; as a result, a piezoelectric micro-spray system is characterized by relatively great flow and great spray area, which accounts for plenty of heat it dissipates when used in a cooling system and great amount of medication it atomizes when used in a medication atomization system. By contrast, with a piezoelectric micro-spray system operating at resonance frequency, material impedance is relatively low, and thus the required current is low enough to allow the piezoelectric micro-spray system to be energy-saving. However, the resonance frequency at which a piezoelectric micro-spray system works is susceptible to ambient factors (for example, temperature), boundary conditions, and a package process; hence, both resonance frequency difference and resonance frequency drift may occur, undermining the system's efficiency and stability.

As disclosed by U.S. Pat. No. 6,422,080, a piezoelectric actuator used in a disc drive system is susceptible to a spring load and a gluing process, thus resulting in resonance frequency changes. Considering that a disc drive system should avoid structural resonance in order to ensure the correctness and stability of data access, the aforesaid patent proposes minimizing vibrational resonance or inhibiting resonance through prevention of the appearance of resonance nodes, by adjusting the extent to which a pivot is fastened to an actuator assembly.

U.S. Pat. No. 5,805,028 was taken out in an attempt to solve the underlying problems of a related system, that is, resonance frequency varies with ambient temperature, and the resonance frequency drift results in decreased efficiency and increased power consumption and accounts for the heat generated by materials. To address the aforesaid problem, U.S. Pat. No. 5,805,028 proposes using a circuit for changing output parameters as well as output temperature-compensated voltage and frequency. Similarly, U.S. Pat. No. 6,819,027 proposes using a circuit to detect resonance frequency and keep the system working at resonance frequency. U.S. Pat. No. 6,569,109 proposes detecting phase difference in a real-time manner with a phase difference detection circuit, and calculating resonance frequency to be outputted in response to ambient variations, using a resonance frequency detection circuit and initial resonance frequency, with a view to coping with the frequency drift problem.

However, all the available problem-coping methods involve using a complicated circuit designed to solve the problem of resonance frequency drift rather than performing simple calibrating work designed to achieve resonance frequency modulation, for example, changing output parameters in a circuit-controlled manner, detecting resonance frequency, manipulating control circuit output and maintaining an intended range of resonance frequency in a circuit-controlled, circuit-feedback manner, with a view to controlling a system and thereby allowing the system to work at resonance frequency, and, alternatively, detecting voltage phase difference, and calculating resonance frequency to be outputted in response to ambient variations, using a resonance frequency detection circuit and initial resonance frequency.

The aforesaid patents propose using mostly a control circuit for operating a system at resonance frequency that differs before and after operation; hence, a micro-spray system functioning in accordance with the prior art demonstrates flow variations or other changes and therefore increased system uncertainty.

Therefore, an existing issue which relates to a micro-spray system and needs urgent resolution involves solving the drawbacks of the prior art, developing a micro-spray system on which frequency correction may be performed before operation and resonance frequency modulation may be performed during operation with a view to increasing spray flow and spray area and minimizing the effect of ambient factors.

SUMMARY OF THE INVENTION

In light of the above-mentioned drawbacks of the prior art, it is a primary objective of the present invention to provide a micro-spray system resonance frequency modulation method and device for adjusting resonance frequency in a real-time manner.

It is another objective of the present invention to provide a micro-spray system resonance frequency modulation method and device such that the performance of the micro-spray system is not subject to ambient factors and thus both spray flow and spray area increase.

Yet another objective of the present invention is to provide a micro-spray system resonance frequency modulation method and device such that the control of resonance frequency may be streamlined, using a simple adjustment mechanism design and control.

To achieve the above-mentioned and other objectives, a micro-spray system resonance frequency modulation device is provided according to the present invention. The micro-spray system resonance frequency modulation device comprises a liquid storage unit, a micro-spray unit for atomizing a liquid in the liquid storage unit by vibration, and a resonance frequency adjustment unit including a resonance frequency adjustment element configured for applying various pressures to the micro-spray unit so as to adjust resonance frequency and nodes thereof.

As regards the aforesaid device, the micro-spray unit includes a micro-sprayer actuation element, a micro-nozzle plate, a sprayer upper lid, and a sprayer base. In a preferred embodiment, the micro-spray unit further includes a plurality of micro-sprayer actuation elements so as to increase required spray flow and spray area. Each of the plurality of micro-sprayer actuation elements includes an actuator, an actuator upper electrode, and an actuator lower electrode, wherein the actuator is made of one selected from the group consisting of piezoelectric porcelain and an electrostrictive material. The resonance frequency adjustment unit includes a resonance frequency adjustment element. In a preferred embodiment, the resonance frequency adjustment unit provides regulation of a compression level so as to adjust resonance frequency and nodes of the micro-spray unit, and the resonance frequency adjustment unit further includes an elastomer for pressing against the micro-spray unit, a resonance frequency detection and control circuit, and a control motor, so as to enhance consistency of resonance frequency before and during operation, promote system stability, and fine tune resonance frequency, by detecting and controlling resonance frequency of the micro-spray system automatically.

A micro-spray system resonance frequency modulation device of the present invention further comprises a plurality of resonance frequency detection and control circuits and a plurality of control motors. Preferably, the plurality of resonance frequency detection and control circuits detect the resonance frequency of the micro-spray system and trigger modulation of the micro-sprayer actuation element by the corresponding control motors, so as to attain the advantage of controlling and calibrating the resonance frequency of a micro-spray system in operation.

To achieve the above-mentioned and other objectives, the present invention further discloses a micro-spray system resonance frequency modulation method for solving the problem of resonance frequency drift in connection with an actuator in operation. The micro-spray system resonance frequency modulation method comprises the steps of: measuring a micro-spray system and adjusting a resonance frequency adjustment unit so as to allow atomization-related operating frequency to be consistent with system resonance frequency (Step S1); driving the micro-spray unit to perform atomization (Step S2); and detecting resonance frequency of the micro-spray system during atomization in a real-time manner and modulating the resonance frequency adjustment unit whenever the detected resonance frequency exceeds operating frequency of the micro-spray system, such that the resonance frequency of the resonance frequency adjustment unit is consistent with the resonance frequency of the micro-spray system (Step S3).

As regards the aforesaid method, in Step S1, a liquid is stored in a liquid storage unit, and the overall operating frequency of the micro-spray system is adjusted, such that the system in operation performs atomization to the full extent and is energy-saving. In Step S2, the micro-sprayer actuation element is driven to perform atomization, and a micro-sprayer actuation element includes an actuator, an actuator upper electrode, and an actuator lower electrode.

In Step S3, in a real-time manner, a resonance frequency detection and control circuit detects and controls resonance frequency of the micro-spray system and drives a control motor to adjust a resonance frequency adjustment element of the resonance frequency adjustment unit, such that the resonance frequency adjustment element applies various pressures to the micro-spray unit so as to adjust the resonance frequency thereof. In a preferred embodiment, the resonance frequency adjustment unit further includes an elastomer, such that modulation of resonance frequency and node positions is performed by adjusting the pressure the elastomer applies to a micro-nozzle plate of the micro-spray unit. The resonance frequency adjustment unit includes a plurality of resonance frequency detection and control circuits and control motors.

The present invention discloses a micro-spray system resonance frequency modulation method and device. The device comprises a micro-sprayer actuation element, a resonance frequency adjustment mechanism, a resonance frequency detection and control circuit, and a control motor. The method involves judging data acquired by the resonance frequency detection and control circuit, controlling and calibrating the resonance frequency of the micro-spray system in operation, and performing real-time measurement and correction repeatedly so as to prevent operating frequency of the micro-spray system in operation from drifting beyond a preferred operating frequency range. Accordingly, the present invention increases spray flow and spray area, minimizes the effect of ambient factors, and solves the problems arising from the prior art.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The following specific embodiments are provided to illustrate the disclosure of the present invention, these and other advantages and effects can be apparently understood by those skilled in the art after reading the disclosure of this specification. The present invention can also be performed or applied by other different embodiments. The details of the specification may be modified or changed on the basis of different points and applications without departing from the spirit of the present invention.

Points needing attention are as follows: the drawings include simple schematic diagrams intended to schematically describe the basic structure of the present invention. The diagrams, however, only illustrate the components relevant to the present invention but do not show their practical appearance. In practice, the quantity, shape and size of the components are selectively designed, and the layout of the components may be even more intricate.

Figure 1A:
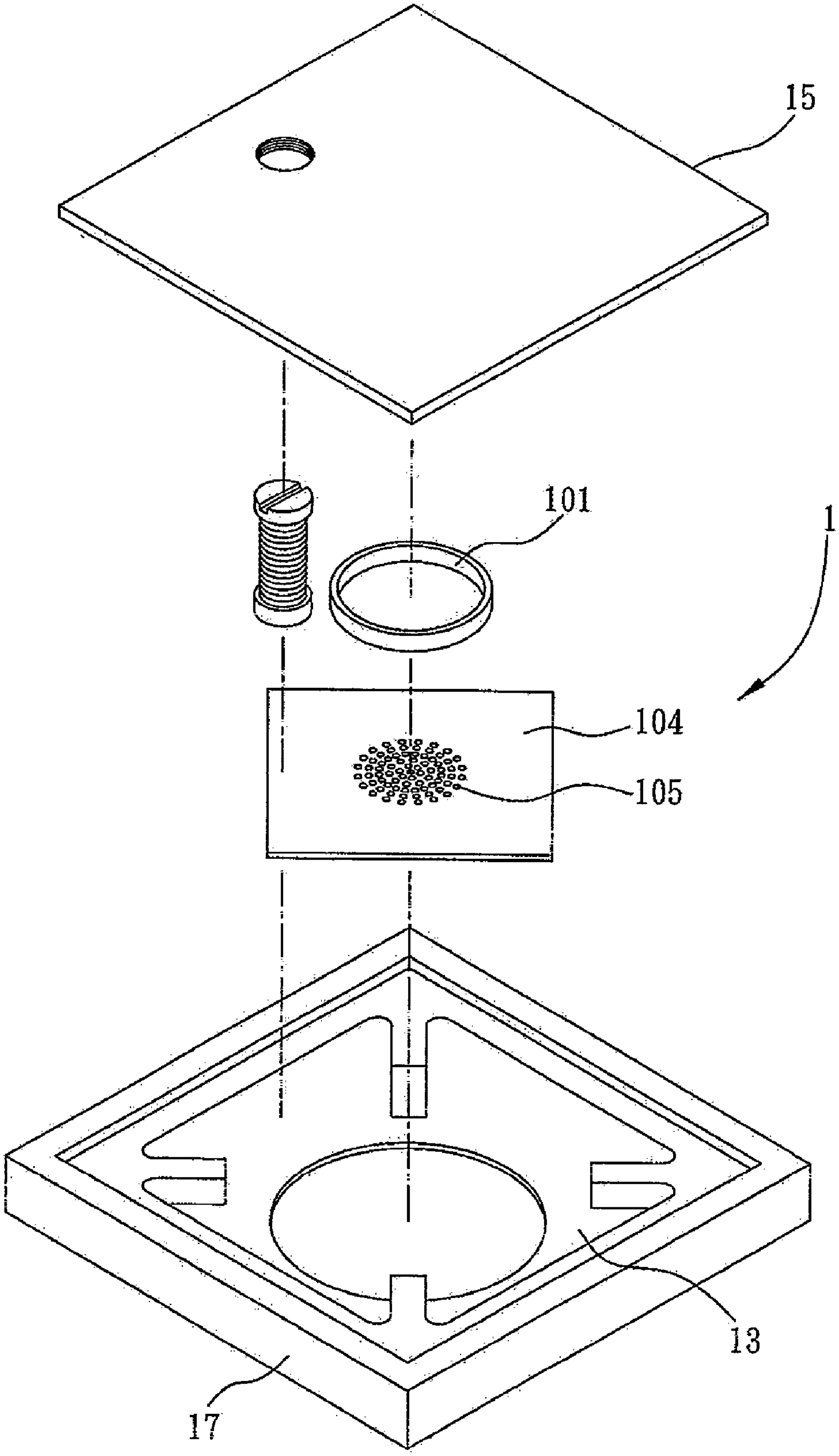
FIG. 1A is a schematic diagram of a micro-sprayer actuation element and a sprayer base of a micro-spray system resonance frequency modulation device in accordance with the present invention.
Figure 1B:
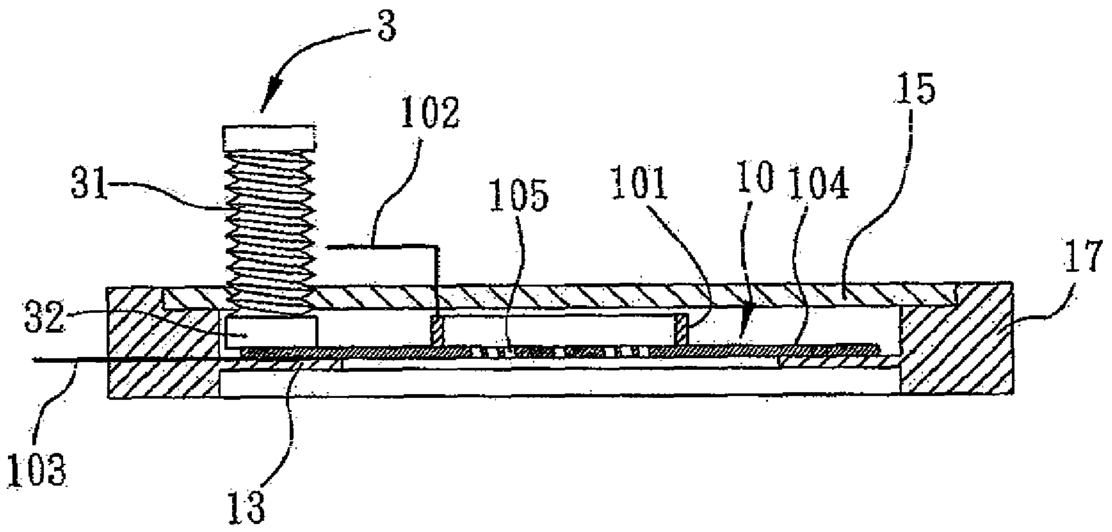
FIG. 1B is a lateral view of the assembly of a micro-spray system resonance frequency modulation device in accordance with the present invention.

FIG. 1A is a schematic diagram of a micro-sprayer actuation element and a sprayer base of a micro-spray system resonance frequency modulation device in accordance with the present invention. FIG. 1B is a lateral view of the assembly of a micro-spray system resonance frequency modulation device in accordance with the present invention. With the present invention, it is feasible to generate tiny heavy droplets and increase spray flow and spray area. The micro-spray system resonance frequency modulation device comprises a micro-spray unit 1 for atomizing a liquid by vibration, and a resonance frequency adjustment unit 3 for controlling resonance frequency of a micro-sprayer actuation element 10, and a liquid storage unit 13 for storing the liquid to be atomized.

Figure 2:
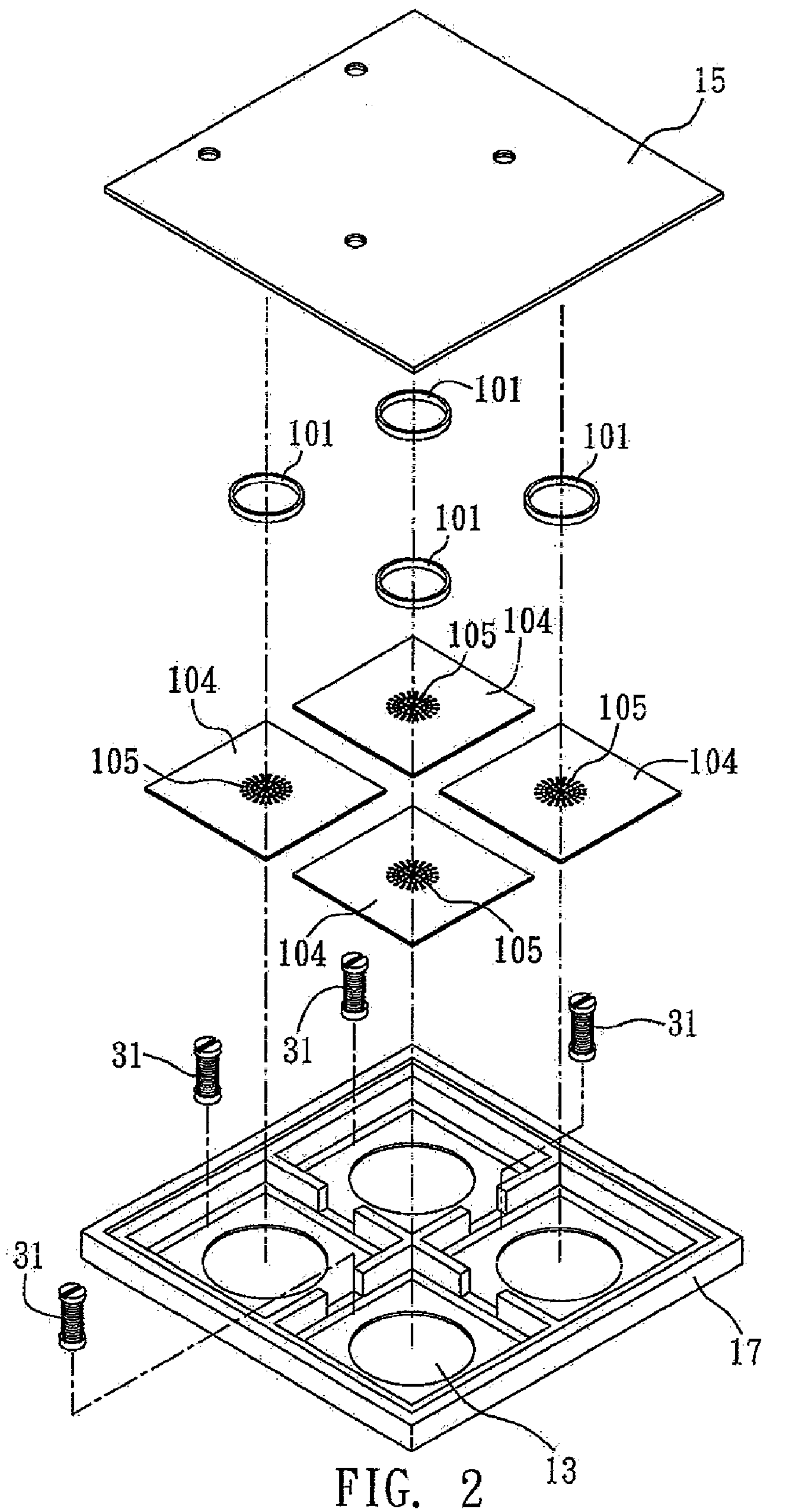
FIG. 2 is an exploded view of an embodiment of a micro-spray system resonance frequency modulation device in accordance with the present invention.

The micro-spray unit 1 comprises the micro-sprayer actuation element 10, a micro-nozzle plate 104, a sprayer upper lid 15, and a sprayer base 17. The micro-spray unit 1 can be implemented, preferably in the form of a plurality of micro-sprayer actuation elements 10. FIG. 2 is an exploded view of an embodiment of a micro-spray system resonance frequency modulation device in accordance with the present invention, showing how to increase spray flow and spray area as required. The micro-sprayer actuation element 10 comprises an actuator 101, an actuator upper electrode 102, and an actuator lower electrode 103. The actuator 101 is made of one selected from the group consisting of piezoelectric porcelain and an electrostrictive material. The liquid to be atomized is ejected, by high-frequency vibration, out of micro-nozzles 105 disposed in the micro-nozzle plate 104 driven by the actuator 101 of the micro-sprayer actuation element 10, so as to form tiny droplets.

Figure 3:
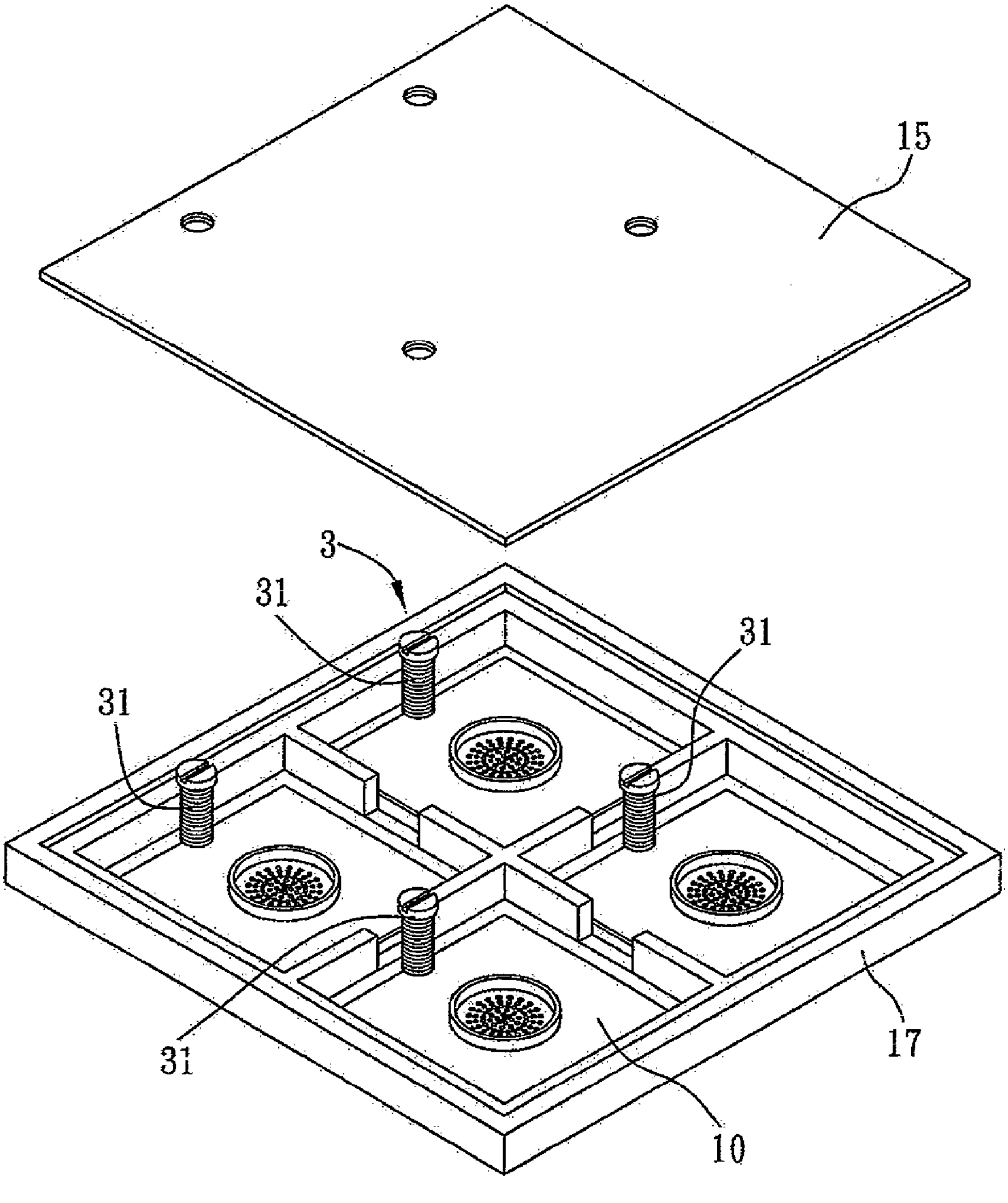
FIG. 3 is a schematic diagram of the assembly of a micro-spray system resonance frequency modulation device in accordance with the present invention.
Figure 4:
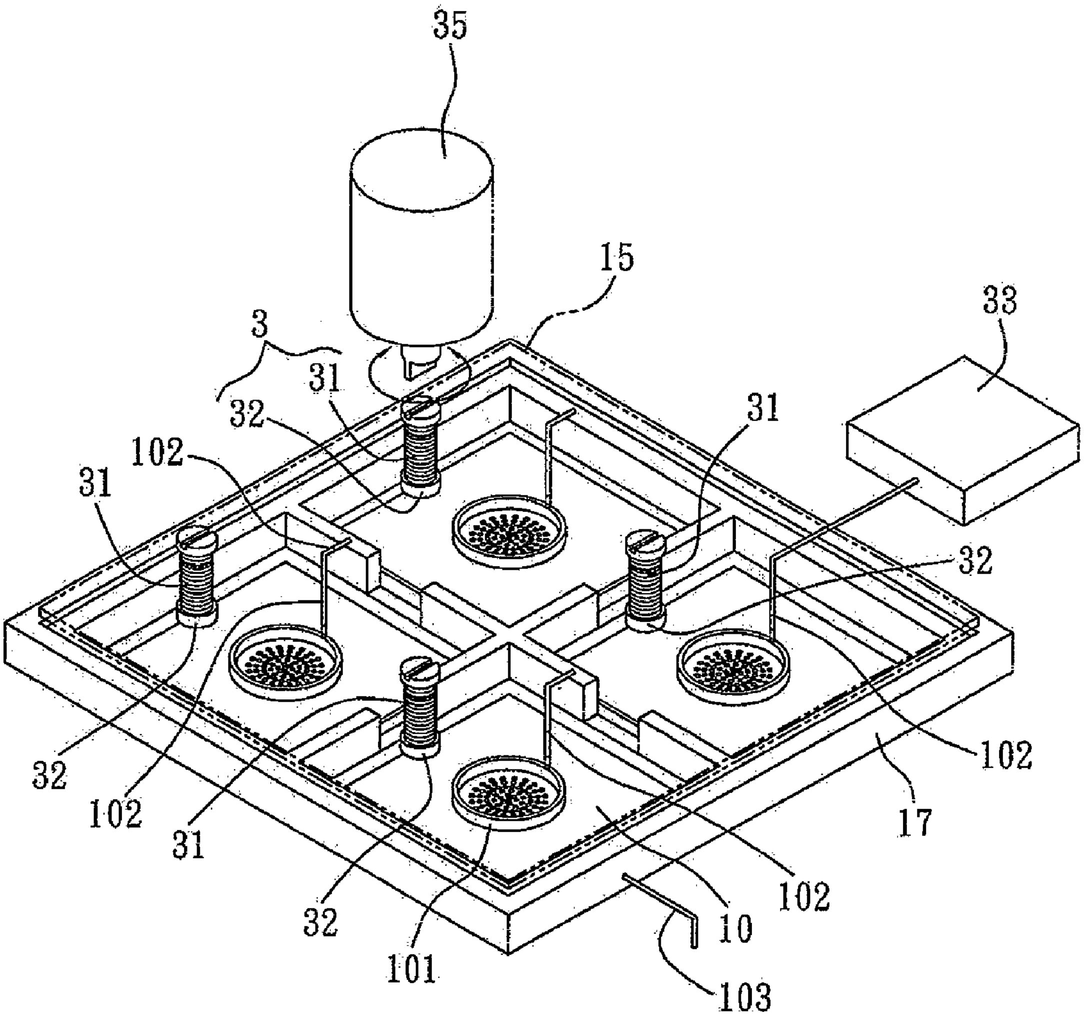
FIG. 4 is a schematic diagram of the assembly of another embodiment of a micro-spray system resonance frequency modulation device in accordance with the present invention.

FIG. 3 is a schematic diagram of the assembly of a micro-spray system resonance frequency modulation device in accordance with the present invention, showing how the present invention solves the resonance frequency drift problem arising from the usage of an actuator. The resonance frequency adjustment unit 3 comprises a resonance frequency adjustment element 31. The resonance frequency adjustment element 31 is a screw driven into the sprayer upper lid 15 so as to increase/decrease pressure exerted on the micro-sprayer actuation element 10 and thereby adjust resonance frequency of the micro-spray system and modulate nodes of the micro-sprayer actuation element 10. FIG. 4 is a schematic diagram of the assembly of another embodiment of a micro-spray system resonance frequency modulation device in accordance with the present invention. The resonance frequency adjustment unit 3 comprises an elastomer 32, a resonance frequency detection and control circuit 33, and a control motor 35. The elastomer 32 enhances a fine-tuning effect and a buffer effect of the pressure exerted on the micro-sprayer actuation element 10 by the resonance frequency adjustment element 31. Atop end of the resonance frequency adjustment element 31 is installed with a concave portion for engagement with a convex portion installed on a top end of a spindle of the control motor 35, so as to detect system resonance frequency automatically and drive the control motor 35 to adjust the resonance frequency adjustment element 31 with a view to enhancing consistency of resonance frequency of the micro-spray system, before and during operation, and promoting system stability.

Figure 5:
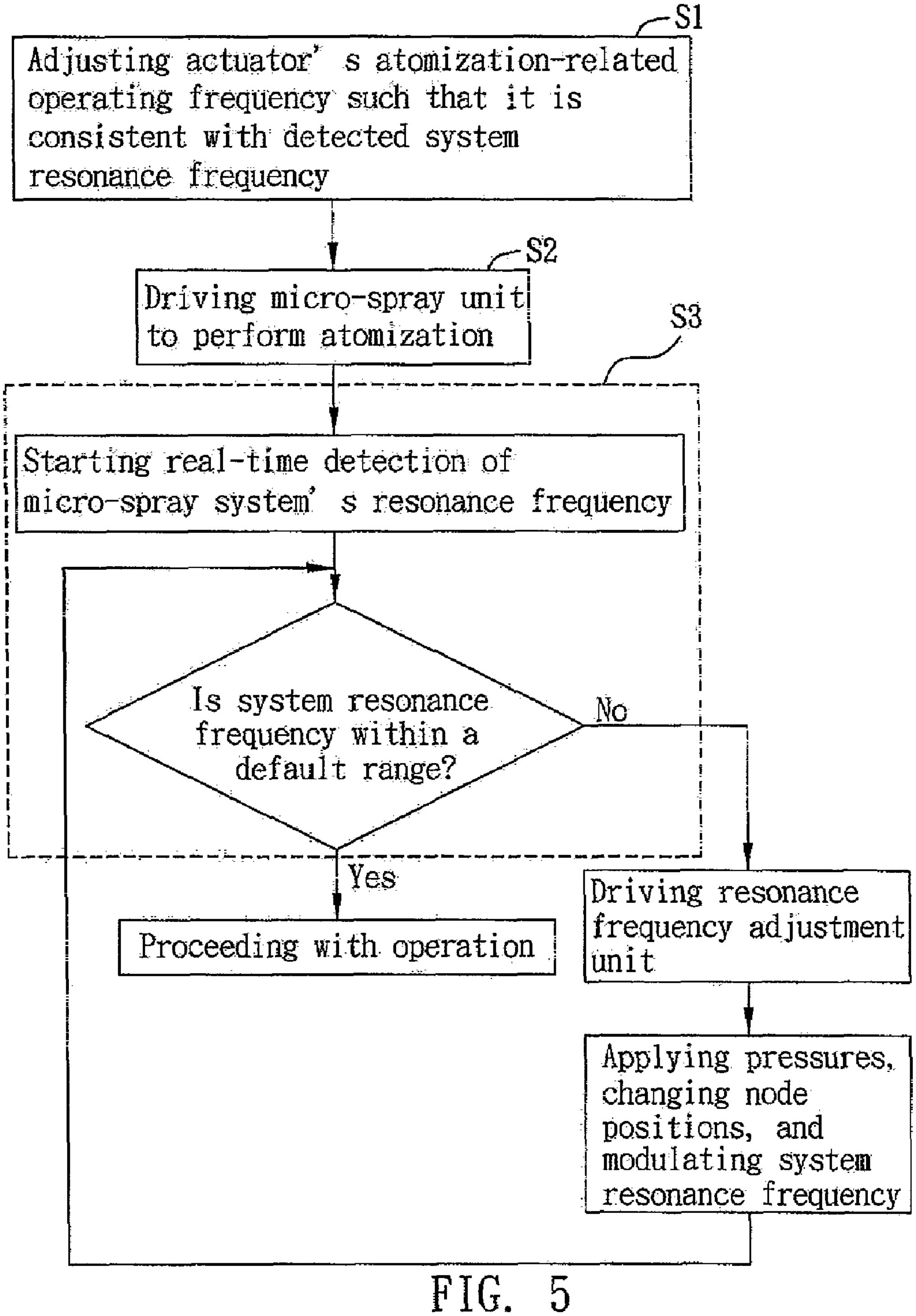
FIG. 5 is a flowchart of a micro-spray system resonance frequency modulation method in accordance with the present invention.

FIG. 5 is a flowchart of a micro-spray system resonance frequency modulation method in accordance with the present invention. The micro-spray system resonance frequency modulation method of the present invention is devised to solve the resonance frequency drift problem arising from the operation of an actuator. The micro-spray system resonance frequency modulation method comprises the steps of: measuring the micro-spray system and adjusting the resonance frequency adjustment unit so as to allow atomization-related operating frequency to be consistent with system resonance frequency; driving the micro-spray unit to perform atomization; and detecting resonance frequency of the micro-spray system during atomization in a real-time manner, modulating the resonance frequency adjustment unit whenever the detected resonance frequency exceeds operating frequency of the micro-spray system, such that the resonance frequency of the resonance frequency adjustment unit is consistent with the resonance frequency of the micro-spray system.

Step S1 involves putting the liquid to be atomized in a liquid storage space of the micro-spray system, measuring resonance frequency of the micro-spray system so as to determine the system resonance frequency after the liquid has been stored, and adjusting a resonance frequency control mechanism in accordance with the determined resonance frequency so as to allow the resonance frequency of the actuator during atomization to be consistent with the resonance frequency of the micro-spray system.

Step S2 involves setting an operating frequency range in accordance with the adjusted resonance frequency, and driving the micro-spray unit to perform atomization, such that the resonance frequency of the micro-spray unit during operation becomes almost consistent with the system resonance frequency. The goal of Step S2 is to ensure that the actuator always starts functioning at optimal operating frequency with optimal efficiency.

Step S3 involves detecting the resonance frequency of the micro-spray system in a real-time manner with the resonance frequency detection and control circuit, driving the resonance frequency adjustment unit and modulating the resonance frequency adjustment element and the elastomer dynamically in accordance with the resonance frequency range set by the system, pressing the micro-sprayer actuation element by the elastomer so as to modulate the resonance frequency of the micro-spray system and the nodes of the micro-sprayer actuation element until the resonance frequency of the micro-sprayer actuation element becomes almost consistent with the resonance frequency of the micro-spray system. The goal of Step S3 is to dynamically adjust and control actuator operating frequency and maintain system operating frequency.

Compared with the prior art, the present invention discloses a micro-spray system resonance frequency modulation method and device to solve the resonance frequency drift problem which occurs to an actuator in operation and protect a micro-spray system from the effects of ambient factors which cause resonance frequency drift. Hence, the present invention promotes system stability, provides maximum fixed spray flow and spray area, stabilizes the micro-spray system and optimizes operation thereof, adopts simple adjustment mechanism design and control, and streamlines the control of resonance frequency. Accordingly, the present invention overcomes the drawbacks of the prior art.

The foregoing embodiments are only illustrative of the features and functions of the present invention but are not intended to restrict the scope of the present invention. It is apparent to those skilled in the art that all modifications and variations made in the foregoing embodiments according to the spirit and principle in the disclosure of the present invention should fall within the scope of the appended claims.

What is claimed is:

1. A micro-spray system resonance frequency modulation device, comprising:

a liquid storage unit;

a micro-spray unit for atomizing a liquid in the liquid storage unit by vibration; and a resonance frequency adjustment unit, including:

a control motor;

a resonance frequency detection and control circuit; and a resonance frequency adjustment element configured for applying various pressures to the micro-spray unit so as to adjust resonance frequency thereof

2. The micro-spray system resonance frequency modulation device of claim 1, wherein the resonance frequency adjustment unit adjusts compression levels so as to adjust resonance frequency and nodes of the micro-spray unit, and the resonance frequency adjustment unit further comprises an elastomer for pressing against the micro-spray unit.

3. The micro-spray system resonance frequency modulation device of claim 1, wherein the micro-spray unit further comprises a micro-sprayer actuation element, a micro-nozzle plate, a sprayer upper lid, and a sprayer base.

4. The micro-spray system resonance frequency modulation device of claim 3, wherein the micro-sprayer actuation element further comprises an actuator, an actuator upper electrode, and an actuator lower electrode.

5. The micro-spray system resonance frequency modulation device of claim 4, wherein the actuator is made of one of piezoelectric porcelain and an electrostrictive material.

6. The micro-spray system resonance frequency modulation device of claim 3, wherein the micro-spray unit further comprises a plurality of micro-sprayer actuation elements.

7. The micro-spray system resonance frequency modulation device of claim 1, wherein the resonance frequency adjustment element is a screw configured to adjust load pressure or node variation.

8. The micro-spray system resonance frequency modulation device of claim 1, wherein the resonance frequency adjustment unit further comprises a plurality of resonance frequency adjustment elements.

9. The micro-spray system resonance frequency modulation device of claim 1, wherein the resonance frequency adjustment unit further comprises a plurality of control motors.

* * * * *